Patented Sept. 14, 1937

2,092,866

UNITED STATES PATENT OFFICE 2,092,866

PREPARING WOOD MATERIAL FOR BEVERAGE TREATMENT

John S. Wisniewski, Cleveland, Ohio

No Drawing. Application February 15, 1935, Serial No. 6,712

2 Claims. (Cl. 99—48)

This invention relates to the coloring and flavoring of liquids and the like and is particularly adapted to use with liquids for use in cooking or for beverage purposes, such as gingerale, cider, vinegar, grape juice and fermented or distilled beverages such as wine and whiskey.

An object of the invention is to provide an improved method of improving the characteristics of liquids.

Another object is to provide an improved method of changing the characteristics of liquids which may be simply and easily accomplished.

Another object of the invention is to provide an improved method of changing the characteristics of liquids which may be accomplished in comparatively short time.

Another object is to provide an improved method of changing the characteristics of liquids which will impart a palatable flavor thereto.

Another object is to provide an improved method of changing the characteristics of liquids which will impart a pleasing color thereto.

Another object of the invention is to provide an improved material which may be used to change the characteristics of liquids.

Other objects will hereinafter appear.

The invention will be better understood from the description of the manner in which it may be applied to a specific liquid, and, for the purpose of illustration, the liquid chosen is whiskey, the process and material, however, being applicable to other liquids, as will readily appear to anyone skilled in the art to which it appertains.

As is well known, whiskey has long been produced by first fermenting a mash to produce alcohol, then distilling the mash to evaporate the alcohol together with an approximately equal quantity of other liquids, condensing to liquid the vapors so distilled, and lastly subjecting this condensate to a process generally known as aging.

Originally, the aging process consisted merely of placing the distilled raw whiskey in wooden barrels and allowing it to stand for a period of years. Subsequently this aging was somewhat expedited by agitating the barrels, and the flavoring and coloring imparted to the raw whiskey was improved by burning the insides of the barrels, which both gave a distinctive flavor to the resulting product and produced a much darker color than was the case with unburnt barrels.

As above stated, aging as it was performed required a substantially great period of time, often requiring that the liquid be kept "in the wood" for a period of years, and even after it had been removed from the barrels or the like and placed in bottles the whiskey continued to age, so that before prohibition there was a large supply of this liquor which had been aged "in the wood", as above described, and then bottled and allowed to stand for periods of ten or twelve years, or even much longer in exceptional cases.

The exact chemical process involved in aging is not fully understood, but it is well established that the characteristics of distilled, fermented, or even soft, beverages may be so improved and the flavor so enhanced, and that simultaneously certain deleterious ingredients may be extracted from the liquid by a close contact with certain woods and with charcoal or carbon. Apparently an interchange of essential oils or other materials is effected between the liquid and solids, probably including a number of chemical reactions.

I have found that this process can be greatly expedited by increasing the surface of wood and carbon in contact with the liquid. Also, I have found that it is necessary that some essential oils be eliminated from the wood, and that others be retained, in order to achieve the results which compare favorably with those obtained by the use of charred barrels.

Merely adding charcoal or other form of carbon and wood is not sufficient, but the material which is to be placed in contact with the liquid must be carefully chosen and prepared to have in it the right, and to have extracted from it the wrong, ingredients.

One material which I have found particularly adapted to this purpose is produced as follows: Starting with a white oak plank approximately two inches in thickness, I burn its two opposite sides, preferably by directing upon them a flame, until the wood has been converted to charcoal to a depth of about one-sixteenth of an inch and not exceeding one-eighth of an inch. The heat to which the wood is subjected while undergoing this step, of course, quite thoroughly drys the wood closely adjacent the charred surfaces and drives much of the volatile material out of the same, the proportion of volatile material driven off decreasing as the center of the plank is approached. Without doubt, some of the volatile material is driven from the outer portions of the plank into the inner portion.

This burning operation, for best results, must be conducted in the open air, so that all material which is volatilized may be carried away and will not recondense upon or in the plank.

After burning, by means of a planing machine or any other suitable tool, I cut the entire plank into shavings or chips, (both shavings and chips being hereinafter referred to as "chips") generally not exceeding an eighth of an inch in thickness.

Next raw whiskey or the like is placed, together with a quantity of the shavings or chips produced as above described, in any suitable container, which may be made of wood, glass, earthenware or the like, and is allowed to stand until the desired color and flavor has been imparted to it. The chips may either be put into the container loosely or may be suspended in a porous bag or the like.

I find that if this aging is carried on at low temperatures, in a very few days raw whiskey has imparted to it a flavor and color comparable to whiskey which has been aged in the wood by the older process above described for over a year. However, the aging step may be still further expedited by maintaining the mixture of raw whiskey and chips at a temperature of between 50 to 55° C., at which temperature the whiskey becomes comparable to year-old whiskey aged by the older process in about half an hour, the maintaining of the mixture at the temperature indicated apparently causing it to much more quickly penetrate the chips and to combine with the ingredients thereof much more effectively. The temperature is, however, low enough that there is no appreciable loss by boiling off the ingredients of the whiskey itself.

As above mentioned, the wood from which the chips are prepared must be heated sufficiently to expel certain of the essential oils and the like, but not sufficiently to expel all of them. For the obtaining of this result I find that it is necessary to burn one surface for each approximate inch of thickness. In other words if a plank one inch thick is used, one side only is burned. If a plank three inches thick is used, one side is burned then this side cut away either by cutting parallel to it and one inch below it, or by cutting it into chips to the depth of one inch, and then both sides are burned and the remainder cut into chips or shavings. Similarly, pieces of wood of any thickness may be used, the new surface being burnt and cut away for one inch, and so on until the entire block of wood is used up.

While the process has been described particularly in regard to its application to whiskey, it will be apparent that it may be applied to other distilled liquors without material change. It also may be applied to vinegar, cider, fermented wines, or to soft drinks such as gingerale, but in each instance the temperature to which it may be heated must not be sufficient to impair the desired characteristics of the liquid. With any of the above described liquids, the process may be carried on precisely as described without heating.

While I have described the above embodiment of my invention in some particularity, obviously many others will readily occur to those skilled in this art, and I do not, therefore, limit myself to the precise details described, but claim as my invention all embodiments, variations and modifications coming within the scope of the appended claims.

I claim:

1. The process of preparing material for the treatment of beverages which comprises burning one side of a piece of wood of substantial thickness to carbonize the same to a depth of about one-eighth inch, cutting chips from the piece including all the burned portions and all the wood therebeneath to a depth of substantially one inch, whereby chips are obtained containing essential oils in varying degree, the chips being of a thickness of an order of one-eighth inch, whereby the beverage liquid may readily penetrate therethrough.

2. The process of preparing material for the treatment of beverages which comprises burning in the open air one side of a piece of wood of substantial thickness to carbonize the same to a depth of about one-eighth inch, cutting chips from the piece including all the burned portions and all the wood therebeneath to a depth of substantially one inch, whereby chips are obtained containing essential oils in varying degree, the chips being of a thickness of an order of one-eighth inch, whereby the beverage liquid may readily penetrate therethrough.

JOHN S. WISNIEWSKI.